(12) United States Patent
Parada

(10) Patent No.: US 6,964,364 B2
(45) Date of Patent: Nov. 15, 2005

(54) WELD GUIDANCE SYSTEM AND METHOD

(76) Inventor: Michael W. Parada, 6237 W. 200 North, Rensselaer, IN (US) 47978

( * ) Notice: Subject to any disclaimer, the term of this patent is extended or adjusted under 35 U.S.C. 154(b) by 21 days.

(21) Appl. No.: 10/709,192

(22) Filed: Apr. 20, 2004

(65) Prior Publication Data
US 2004/0256437 A1 Dec. 23, 2004

Related U.S. Application Data

(60) Provisional application No. 60/320,132, filed on Apr. 22, 2003.

(51) Int. Cl.[7] .............................................. B23Q 15/20
(52) U.S. Cl. ........................... 228/12; 228/32; 219/706
(58) Field of Search ................................ 228/102, 8, 9, 228/10, 12, 25, 32, 45; 324/207.18; 73/602; 219/121.63, 121.64, 121.62, 518, 706; 250/559.38

(56) References Cited

U.S. PATENT DOCUMENTS

| | | | | |
|---|---|---|---|---|
| 4,303,883 A | * | 12/1981 | Mori et al. | 324/207.18 |
| 4,523,973 A | * | 6/1985 | Nelson | 216/84 |
| 4,531,409 A | * | 7/1985 | Koch et al. | 73/588 |
| 5,538,056 A | * | 7/1996 | Thoma | 144/342 |
| 5,592,078 A | * | 1/1997 | Giragosian et al. | 324/207.18 |
| 6,178,819 B1 | * | 1/2001 | Smartt et al. | 73/622 |

* cited by examiner

Primary Examiner—Jonathan Johnson
(74) Attorney, Agent, or Firm—Gary M. Hartman; Domenica N. S. Hartman; Hartman & Hartman

(57) ABSTRACT

A method and guidance system for accurately positioning a welding torch relative to a desired weld path. The method and system are based on ultrasonic sensing of information relating to the distance between the welding torch and surfaces on one or more components being welded, and then using this information to move the welding torch to a specific point in space relative to the desired weld path. The method and system maintain the welding torch over the weld path and at a predetermined distance from the weld path during movement of the torch along the weld path.

12 Claims, 12 Drawing Sheets

Figure 11:
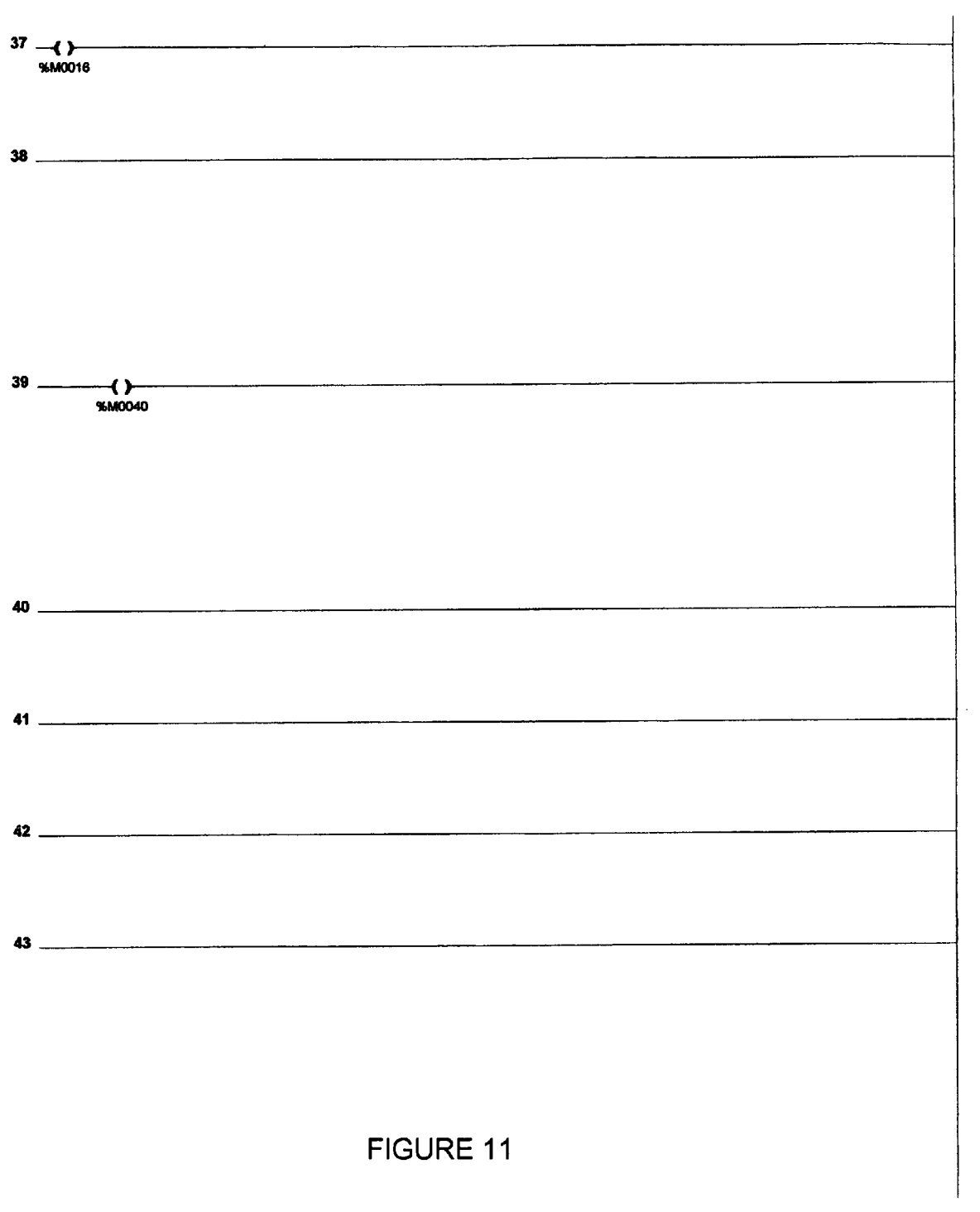

WELD GUIDANCE SYSTEM AND METHOD

CROSS REFERENCE TO RELATED APPLICATIONS

This application claims the benefit of U.S. Provisional Application No. 60/320,132, filed Apr. 22, 2003.

BACKGROUND OF INVENTION

1. Field of the Invention

The present invention generally relates to welding processes and equipment. More particularly, this invention relates to a method and equipment for performing a welding operation using ultrasonic sensing to position a welding head relative to a workpiece on which the welding operation is being performed.

2. Description of the Related Art

Automated welding operations make use of controls to accurately position a welding head or torch relative to the workpiece or workpieces being welded. For example, automated welders often employ a guidance system that includes a track on which the unit is mounted to maintain the position of the torch over the desire weld path, and the torch is mounted to a movable slide that enables automatic adjustment of the distance between the torch and the surface being welded. Currently, most guidance systems use various forms of mechanical and electronic systems to position the welding torch, from simple systems such as guide rollers to more elaborate artificial vision and laser controls. Due to the nature of the welding process, by-products such as intense light, x-rays, smoke, heat, and molten metal become interfering factors in the weld zone and often result in failure to position the weld torch accurately. Such systems also may require a large amount maintenance.

In view of the above, there is a need for welding guidance systems that are not sensitive to by-products within the weld environment and can accurately position a welding torch relative to the surface being welded.

SUMMARY OF INVENTION

The present invention provides a method and guidance system for accurately positioning a welding torch relative to a desired weld path. The method and system are based on ultrasonic sensing of information relating to the distance between the welding torch and surfaces on one or more components being welded, and then using this information to move the welding torch to a specific point in space relative to the desired weld path.

According to a first aspect of the invention, a welding system comprises a welding unit including a welding torch positioned in proximity to a weld path on a component for forming a weldment along the weld path. A first means is provided for moving the welding torch along the weld path, at least one ultrasonic sensing device is operatively mounted with the welding unit for ultrasonically sensing the proximity of a surface and producing a sensor output in proportion to the proximity of the surface, and a second means is provided for moving the welding torch relative to the weld path in directions normal to and transverse to the weld path. Finally, control means is provided for receiving the sensor output from the ultrasonic sensing device, generating a control output based on the sensor output, and sending the control output to the second moving means to maintain the welding torch over the weld path and at a predetermined distance from the weld path during movement of the welding torch along the weld path by the first moving means.

According to a second aspect of the invention, a method is provided for performing a welding operation. The method involves positioning a welding torch of a welding unit a predetermined distance from a weld path on a component by ultrasonically sensing the proximity of at least one surface, producing a sensor output in proportion to the proximity of the surface, generating a control output on the basis of the sensor output, and using the control output to move the welding torch relative to the weld path in directions normal to and transverse to the weld path so as to obtain the predetermined distance between the welding torch and the weld path. Thereafter, the welding torch is operated to form a weldment along the weld path while the welding torch is moved along the weld path, the surface is ultrasonically sensed to produce the sensor output, and the control output is generated to move the welding torch relative to the weld path in directions normal to and transverse to the weld path to maintain the predetermined distance between the welding torch and the weld path.

A significant advantage of the invention is the ability to overcome problems encountered by other weld guidance systems. For example, ultrasonic sensing as employed by this invention is not affected by light, smoke, heat, or x-rays. Furthermore, ultrasonic sensing can be effective when positioned at distances from the surface being sensed so that the sensors are not located near the weld zone and thus are not affected by molten metal.

Other objects and advantages of this invention will be better appreciated from the following detailed description.

BRIEF DESCRIPTION OF DRAWINGS

FIGS. 3 through 13, in combination, represent PLC programming instructions for carrying out a welding operation with systems of the type represented in FIGS. 1 and 2.

DETAILED DESCRIPTION

Figure 1:
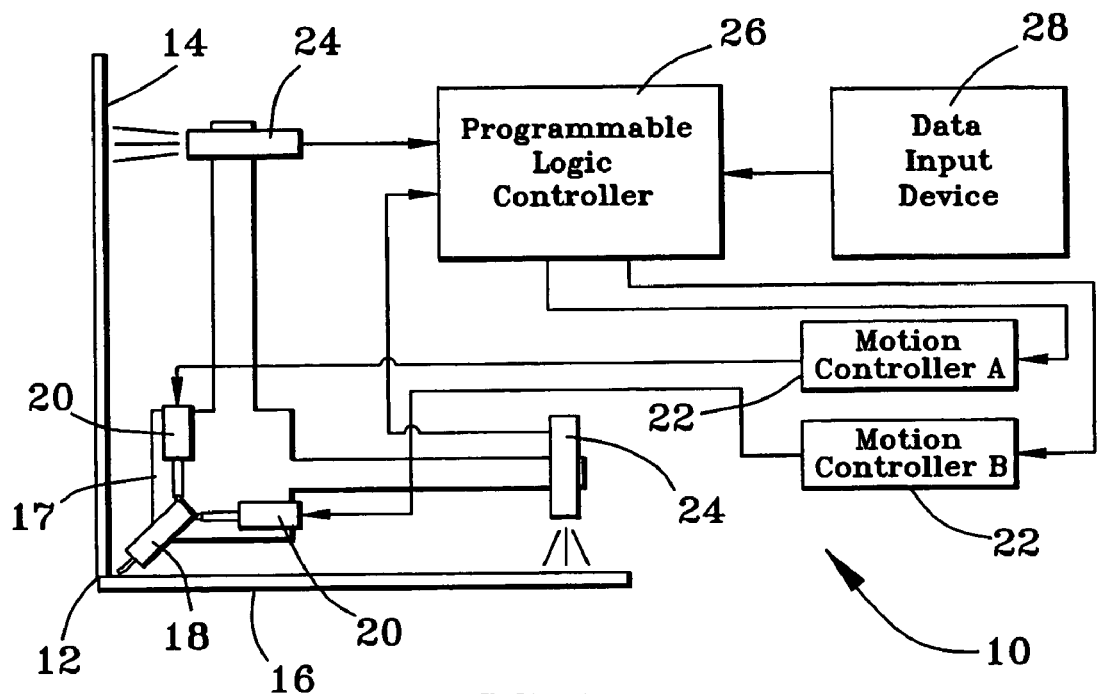
FIGS. 1 and 2 schematically represent welding systems in accordance with embodiments of the invention.

A welding system 10 is illustrated in FIG. 1 as including a welding torch 18 whose position relative to a weld path 12 requires precise control to ensure the quality of the resulting weldment. The weld path 12 is depicted as being defined by a joint between a pair of workpieces 14 and 16 oriented perpendicular to each other, though the invention is not limited to such a configuration. The position of the torch 18 relative to the weld path 12 is controlled by a guidance system that comprises linear actuators 20 physically coupled to the torch 18 for moving the torch 18 relative to the weld path 12, including movement toward and away from the path 12 and movement transverse to the path 12. The guidance system further includes motion controllers 22 for controlling the actuators 20, ultrasonic sensors 24 for sensing the proximity of surfaces of the workpieces 14 and 16, a programmable logic controller (PLC) 26 for communicating with the motion controllers 22 and ultrasonic sensors 24, and a data input device 28 through which instructions are inputted to the PLC 26.

As known, the operating principle of the ultrasonic sensors 24 is to direct a beam of sound at the targeted surfaces of the workpieces 14 and 16. Sound waves are reflected by the surfaces back to receivers on the sensors 24, and the distance the waves have traveled (and therefore the distance between sensor 24 and workpiece 14 or 16) is determined by the amount of time that was needed to travel to and from the surfaces. Each sensor 24 produces an analog output signal proportional to the sensed distance. The output signal may be either a voltage or current, and is delivered as an input to the PLC 26. Various ultrasonic sensing devices could be used as the sensors 24 of this invention, a notable example of which is models UB500-18GM75-I-V1 and UB500-18GM75-U-V1 available from␣PepperI+Fuchs, Inc., of Twinsburg, Ohio. These sensors having sensing ranges of about 127 to 235 mm, allowing the sensors 24 to be placed well away from the workpieces 24. The sensors 24 are shown as also being located some distance from the weld path 12. This distance can vary depending on the geometry of the workpieces 14 and 16. For example, the planarity of the workpieces 14 and 16 shown in FIG. 1 will determine in part how close the sensors 24 must be located to the weld path 12 in order to accurately indicate how far the torch 18 is from the weld path 12.

The actuators 20 are individually associated with the ultrasonic sensors 24 such that the operation of a given actuator 20 is based on the output of a given sensor 24. In FIG. 1, the horizontally-oriented (lower) actuator 20 and the horizontally-oriented sensor 24 (adjacent workpiece 14) are associated, as are the vertically-oriented (upper) actuator 20 and the horizontally-oriented sensor 24 (adjacent workpiece 16). The sensors 24 are physically connected to the welding torch 18 (e.g., via a frame schematically represented at 17 in FIG. 1), such that movement of the torch 18 by the actuators 20 causes essentially an identical amount of movement of the sensors 24. For example, downward movement of the torch 18 a vertical distance of one centimeter causes the vertically-oriented sensor 24 to move closer to the workpiece 16 a distance of one centimeter. In practice, series TMD100 actuators available from Duff-Norton have been found to perform well as the actuators 20 for the guidance system represented in FIG. 1. Suitable motion controllers 22 for the actuators 20 are model KBMG-212D available from KB Electronics, Inc.

The PLC 26 converts the analog signals of the sensors 24 to a digital value within a range, e.g., between 0 and 32000 counts. A suitable PLC is a model MiniOCS or MiniRCS available from GE Fanuc. The data input device 28 is used to input a targeted digital value to the PLC 26 corresponding to the desired distance between the torch 18 and the weld path 12. The digital values based on the signals from the sensors 24 are then compared to the targeted digital value corresponding to the desired torch distance. A mathematical algorithm is then performed by the PLC 26 to generate control outputs that are delivered to the motion controllers 22 for appropriately operating the actuators 20 to move the torch 18 horizontally and/or vertically as necessary to obtain the desired torch distance. For example, assuming the desired torch distance corresponds to a count value of 14000 for one of the sensors 24 and conversion of the analog signal from that sensor 24 yields a digital value of 15000 counts within the 0 to 32000 count range set by the PLC 26, a comparison of the sensed count value and the targeted count value would evidence that the position of the sensor 24 is 1000 counts greater than the targeted count. To reposition the sensor 24 so that its position (and therefore its sensed count value) coincides with the targeted count value, the PLC 26 produces a control output (e.g., an ac or dc signal) that instructs the motion controller 22 for the actuator 20 associated with the sensor 24 to move the weld torch 18 toward the weld path 12 a distance corresponding to 1000 counts. Once the torch 18 has moved the specified distance, the PLC 26 terminates the control output, the output of the sensor 24 is again converted and a second computation is performed to verify that the torch 18 is now positioned at the targeted distance from the weld path 12.

In the above manner, the PLC 26 is able to achieve and maintain the desired distance between the torch 18 and the weld path 12 by an interpolation algorithm. FIGS. 3 through 11 represent, in combination according to their numbered instruction lines, PLC programming instructions for carrying out a welding operation with the welding system 10 represented in FIG. 1. At line 15 of the instructions, a target torch distance is entered and values for the horizontal and vertical axes are stored in registers R0015 and R0020. Line 16 performs the necessary conversions to count values within the count range (0 to 32000). At lines 23 to 27, the signal (converted from analog to a count value at line 16) from the sensor 24 sensing in the vertical axis is compared to the targeted count value for the vertical position of the torch 18. If repositioning is required based on a greater than (GT_INT) or less than (LT_INT) result from the comparison, a command for vertical movement of the torch 18 is made at either line 24 or line 25, respectively, and lowering or raising of the torch 18 is initiated at line 26 or 27, respectively. Lines 30 through 35 perform essentially the identical operations for the horizontal axis as lines 23–27 for the vertical axis. Notably, the instructions provide for positioning of the torch 18 in one axis before positioning is performed in the other axis (or axes). Positioning of the torch 18 is by interpolation because the signals from the sensors 24 are received and compared to the targeted count value continuously during movement of the torch 18 in response to previous signal comparisons, so that the desired torch distance is obtained quickly with extreme accuracy.

Figure 2:
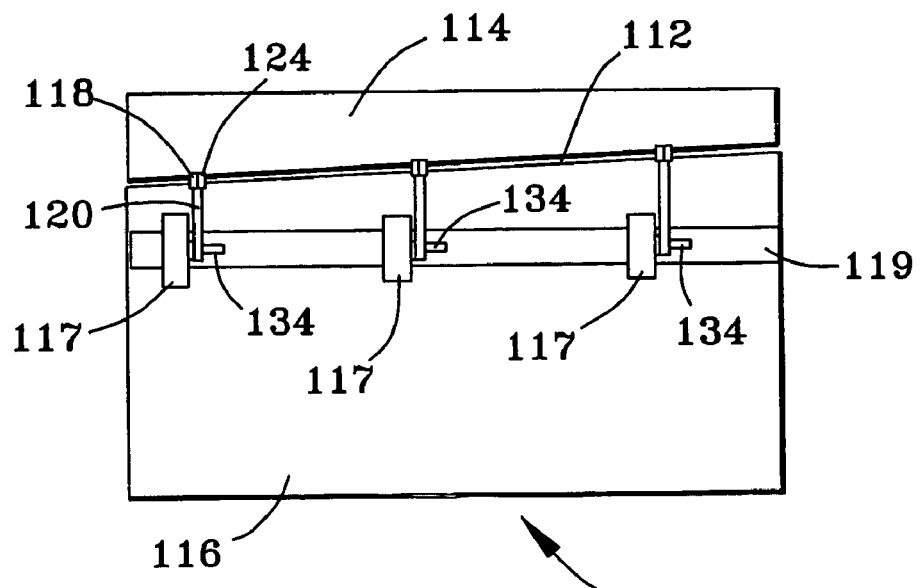
Figure 3:
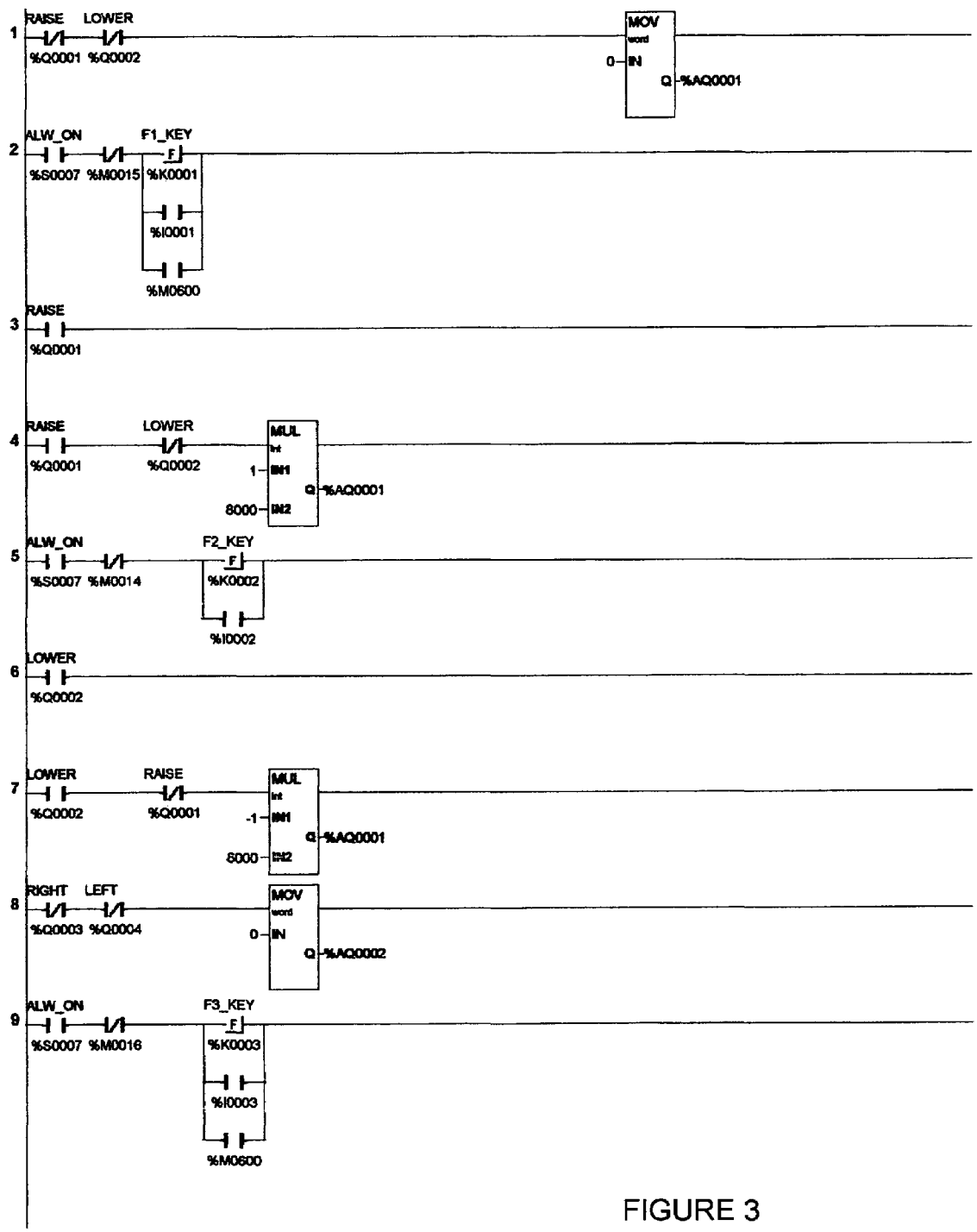
Figure 4:
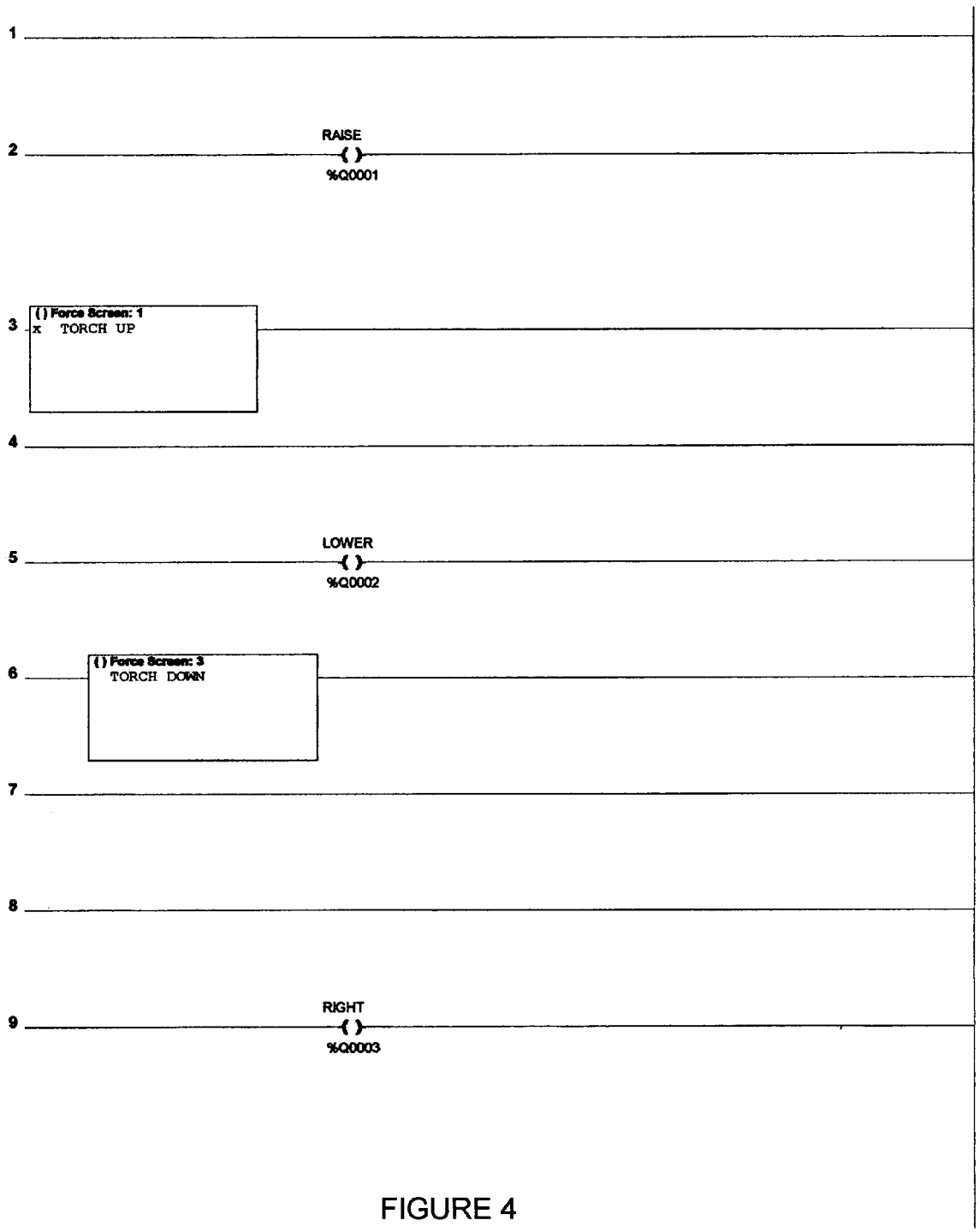
Figure 5:
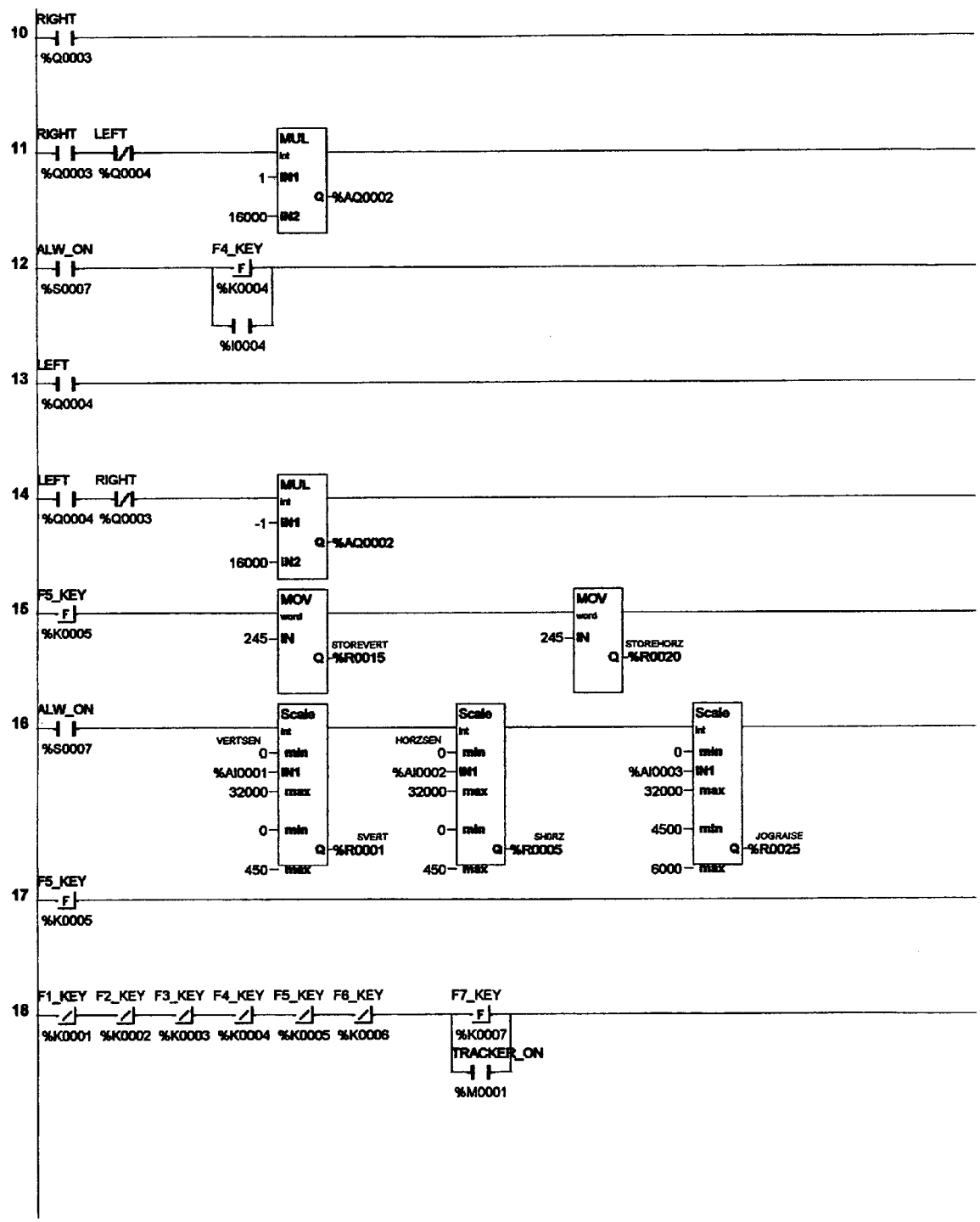
Figure 6:
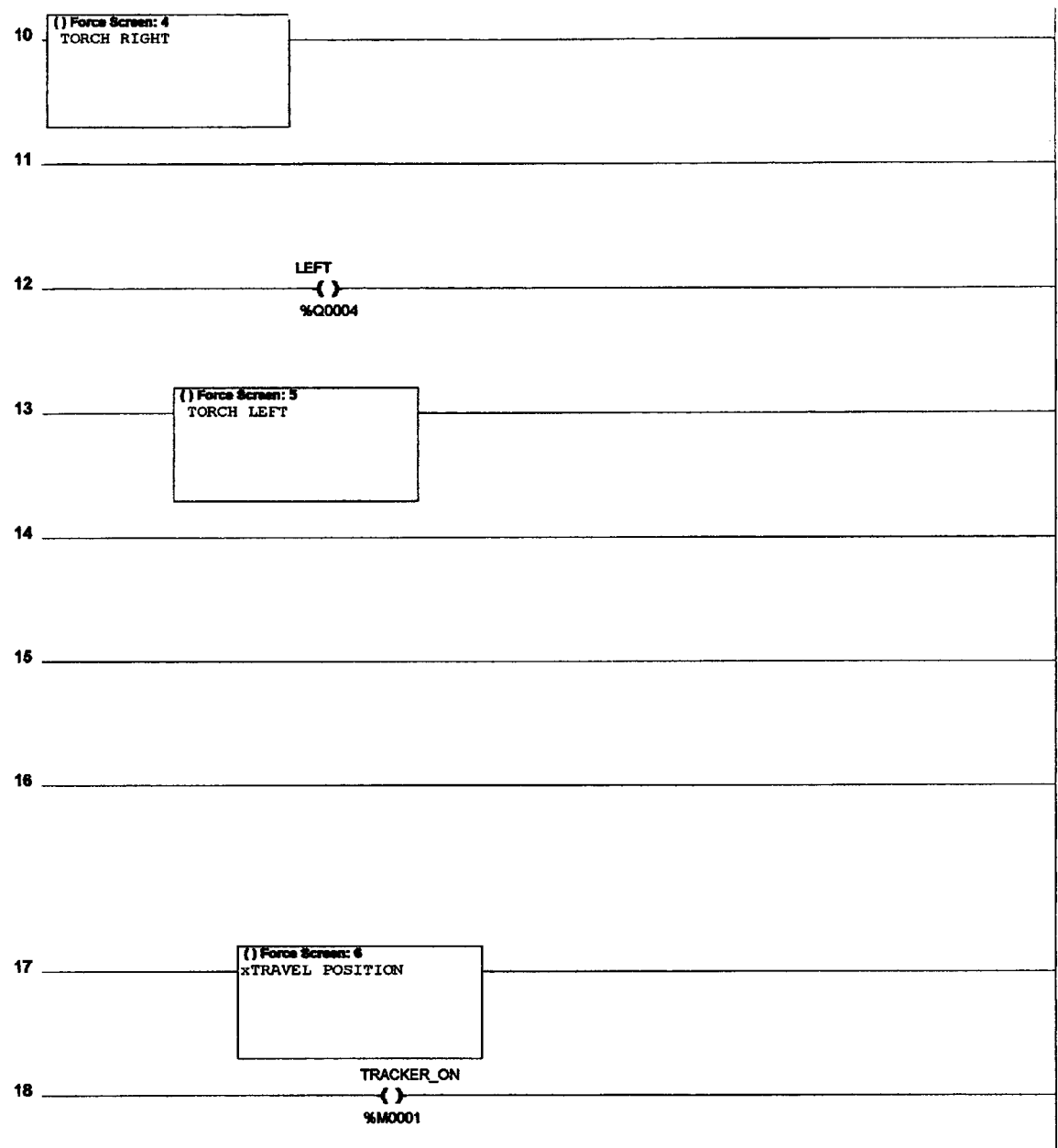
Figure 7:
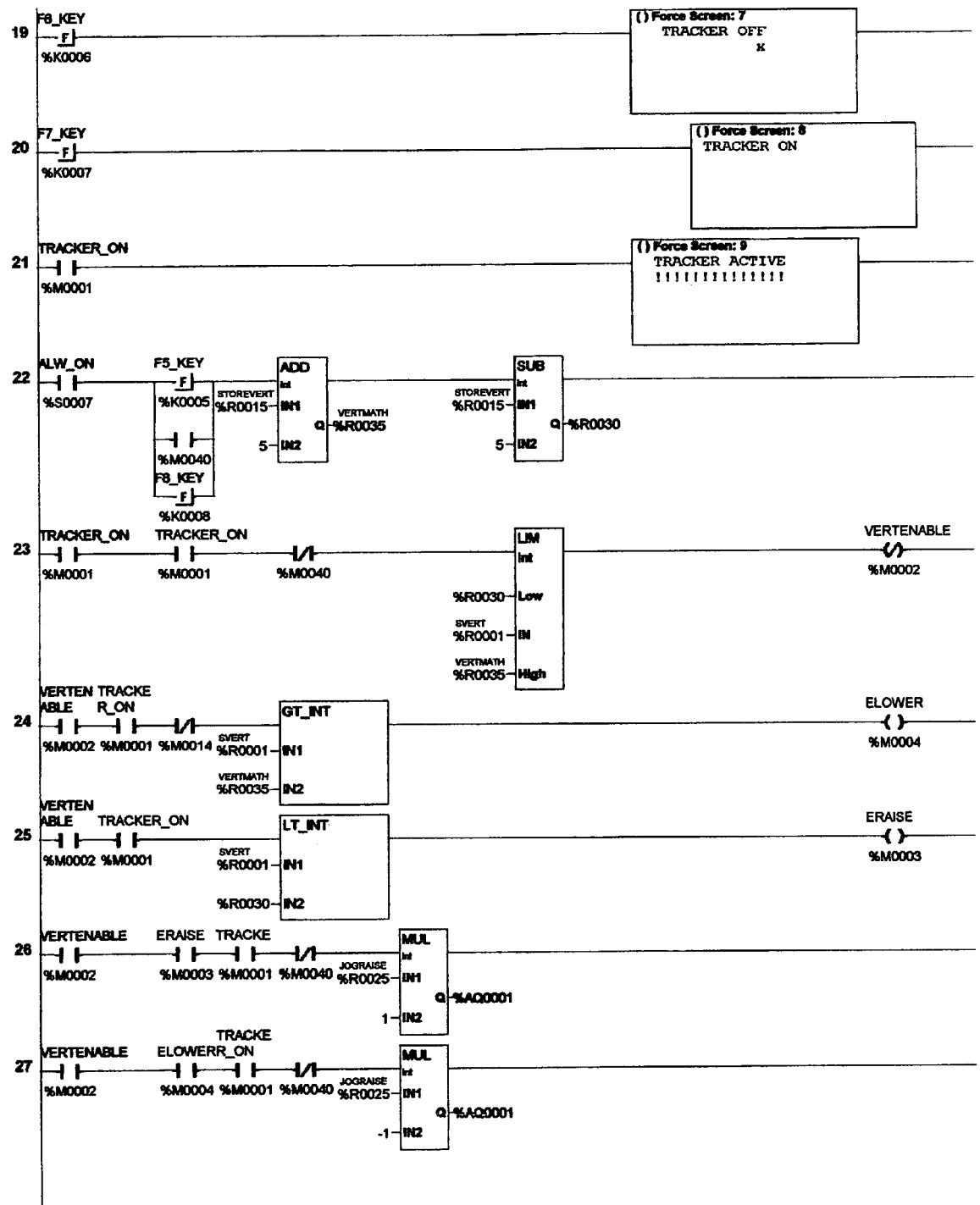
Figure 8:
Figure 9:
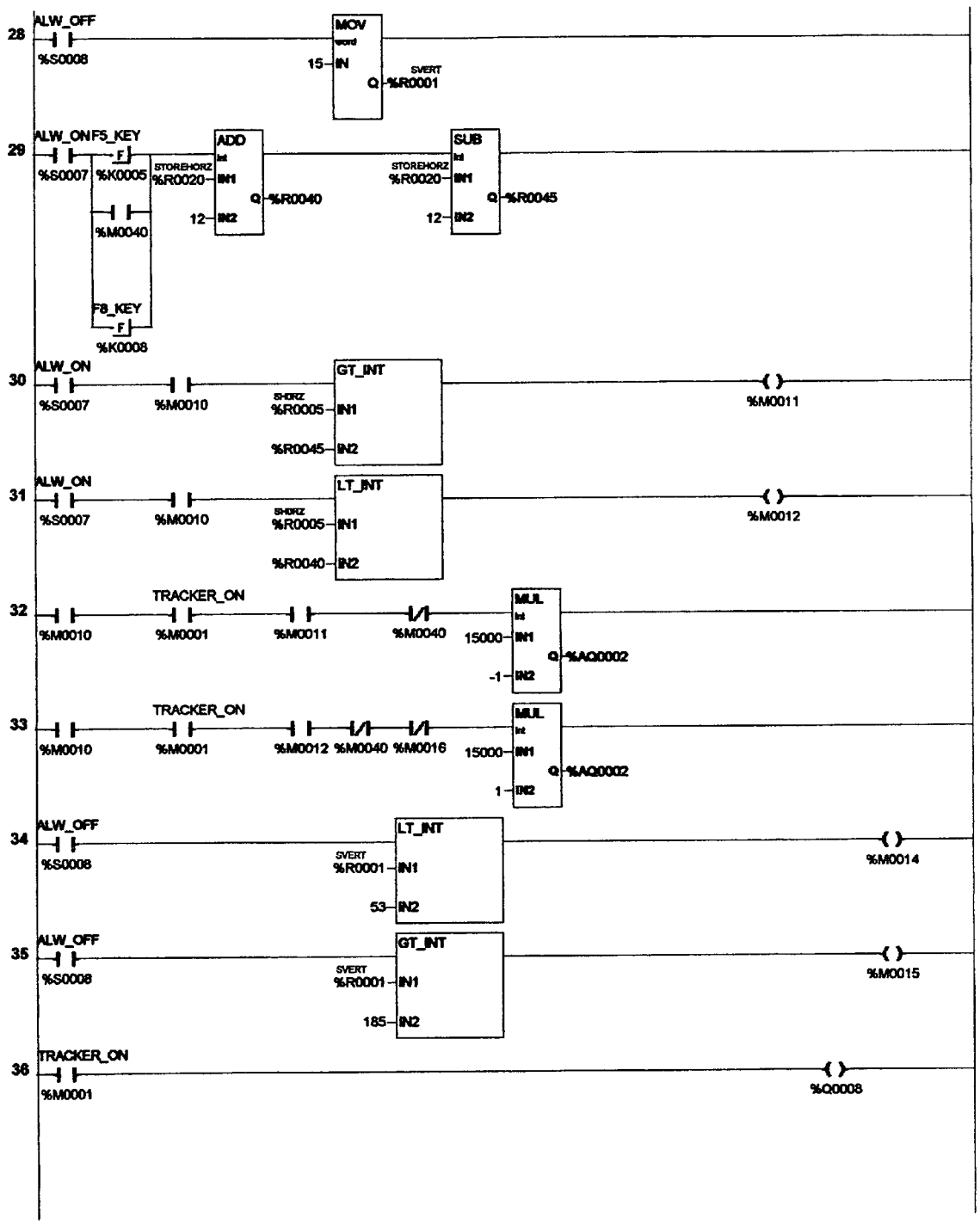
Figure 10:
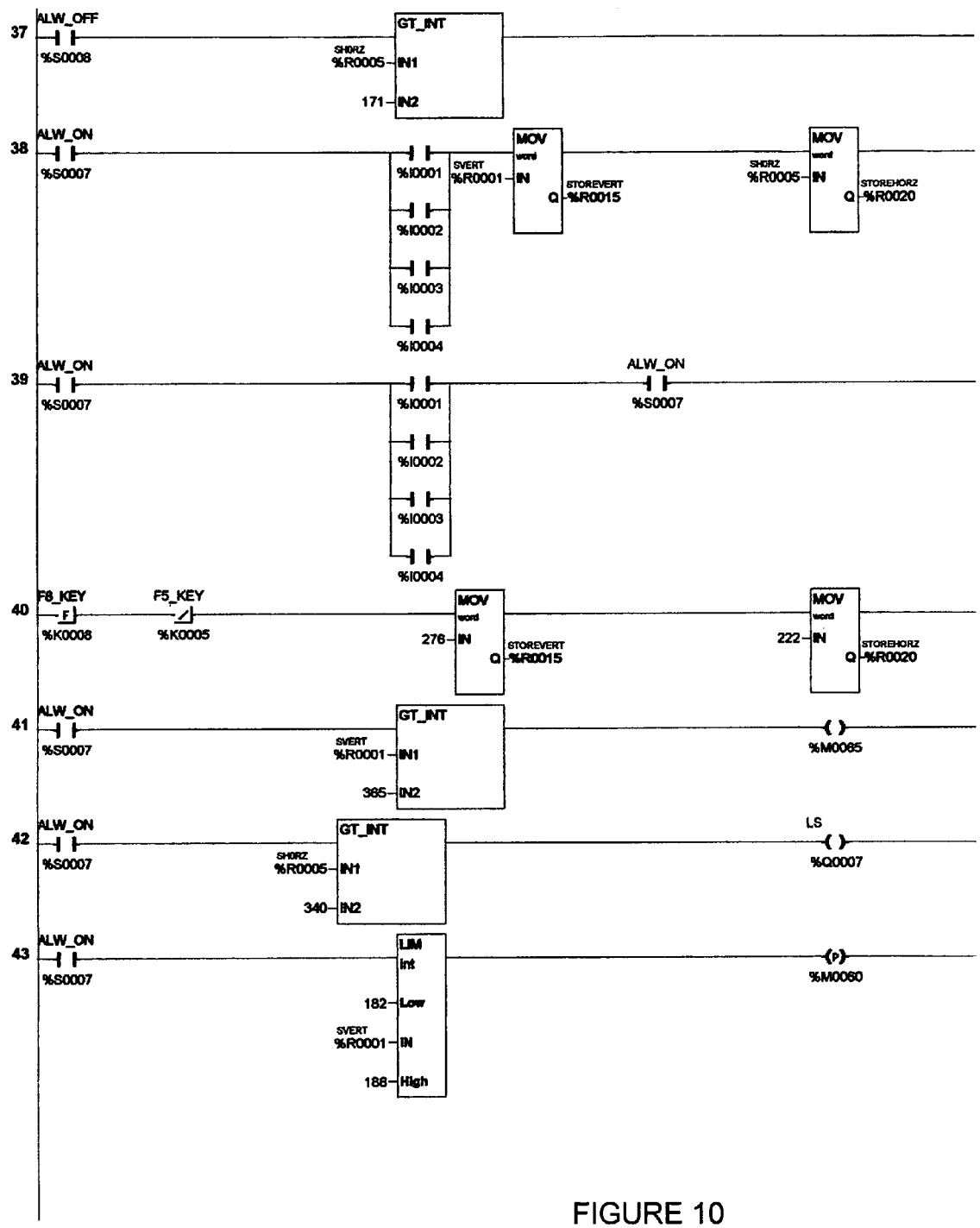
Figure 12:
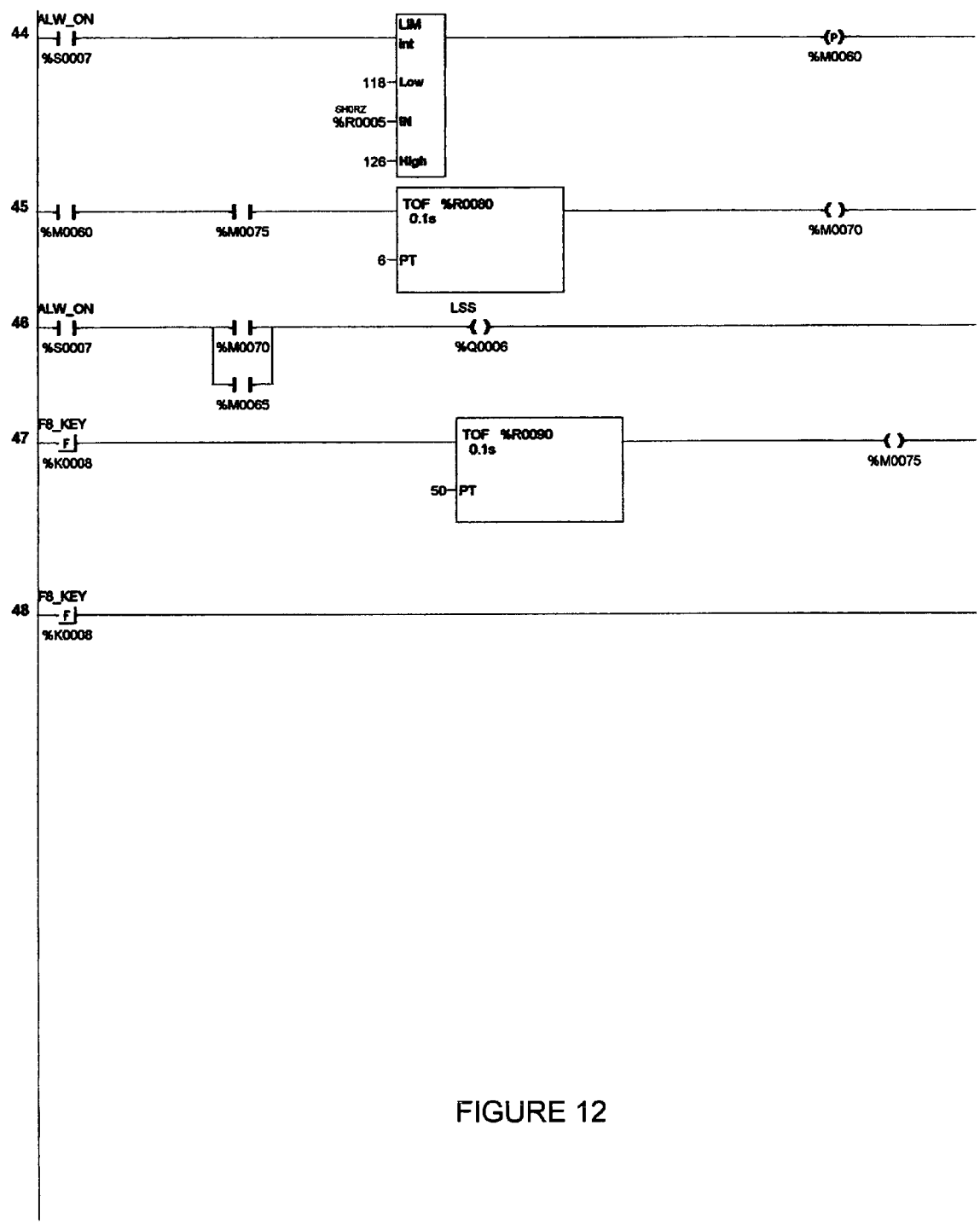
Figure 13:
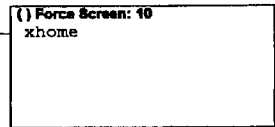

Another example of an application for a welding guidance system in accordance with this invention is represented in FIG. 2, which is a top view of two plates 114 and 116 to be welded together with a torch 118 positioned directly above a weld path 112. In FIG. 2, the plates 114 and 116 lie in the same plane and the weld path 112 is defined by a flat butt fillet joint formed by and between edges of the plates 114 and 116. As such, the edges of the plates 114 and 116 facing the torch 118 and forming the weld path 112 are beveled. The torch 118 is part of a gantry-type welding system 110 in which the torch 118 is mounted to a carriage 117 (three carriages 117 are represented in FIG. 2 to illustrate how the position of the torch 118 adapts as the carriage 117 travels along the weld path 112). The carriage 117 is mounted on a track 119 attached to one of the plates 116 alongside the weld path 112. The torch 118 and an ultrasonic sensor 124 are supported with an actuator arm 120 extending from the carriage 117, so that the actuator arm 120 is operable to position both the torch 118 and sensor 124 directly over the weld path 112.

In FIG. 1, the single sensor 124 senses the distance between the torch 118 and weld path 112 as well as the location of the weld path 112 in the direction transverse to the direction of torch travel. To perform the latter, the sensor 124 locates the weld path 112 as a result of the beveled edges of the plates 114 and 116. The output of the sensor 124 is operated on by a controller (not shown) which, in accordance with the previous embodiment, generates a control output by which the actuator arm 120 is operated to position and thereafter maintain the position of the torch 118 directly above the weld path 112. When the guidance system is enabled and welding started, the carriage 117 travels the length of the track 119, causing the torch 118 to travel the length of the weld path 112. In FIG. 2, the variation in the position of the weld path 112 relative to the track 119 is recognized by the guidance system as a change in the output of the sensor 124, which as previously noted occurs because of the shape of the beveled joint that forms the weld path 112.

As an optional feature of the invention, the welding system 110 represented in FIG. 2 includes an additional ultrasonic sensor 134 mounted to the carriage 117 for ultrasonically sensing the position of the carriage 117 along the weld path 112, e.g., by directing sound waves toward one or more surfaces (not shown) along the length of the track 119 or at either end of the track 119. As with the sensor 124, the additional sensor 134 produces a sensor output in proportion to the position of the carriage 117, and the controller receives the sensor output from the sensor 134 and generates a second control output by which movement of the carriage 117 along the track 119 can be controlled.

In welds longer than about twelve inches (about 30 cm), distortion of the material being welded from heat produced in the process of welding can result in poor quality welds. The ultrasonic tracking capability provided by the sensors 24 and 124 of this invention enables the position of the torches 18 and 118 to be maintained at small tolerances (e.g., about 0.010 inch (about 0.24 mm)) from their weld paths 12 and 112 at all times during the welding operation, reducing variations in temperature that lead to distortion.

While the invention has been described in terms of a preferred embodiment, it is apparent that other forms could be adopted by one skilled in the art. Therefore, the scope of the invention is to be limited only by the following claims.

What is claimed is:

1. A welding system comprising:
a welding unit including a welding torch positioned in proximity to a weld path on a component for forming a weldment along the weld path;
first means for moving the welding torch along the weld path;
at least one ultrasonic sensing device operatively mounted with the welding unit for ultrasonically sensing the proximity of a surface and producing a sensor output in proportion to the proximity of the surface;
second means for moving the welding torch relative to the weld path in directions normal to and transverse to the weld path; and
control means for receiving the sensor output from the ultrasonic sensing device, generating a control output based on the sensor output, and sending the control output to the second moving means to maintain the welding torch over the weld path and at a predetermined distance from the weld path during movement of the welding torch along the weld path by the first moving means and at least a second ultrasonic sensing device operatively mounted with the welding unit for ultrasonically sensing the position of the welding unit along the weld path and producing a second sensor output in proportion to the position of the welding unit, wherein the control means comprises means for receiving the second sensor output from the second ultrasonic sensing device, generating a second control output, and sending the second control output to the first moving means.

2. The welding system according to claim 1, wherein the surface sensed by the ultrasonic sensing device is a surface of the component spaced apart from the weld path.

3. The welding system according to claim 1, wherein the surface sensed by the ultrasonic sensing device is a surface of the weld path.

4. The welding system according to claim 1, wherein the control means comprises an input device for inputting to the control means a target value corresponding to the predetermined distance.

5. The welding system according to claim 4, wherein the control means comprises interpolation means for comparing the sensor output to the target value and generating the control output by interpolation based on the comparison between the sensor output and the target value.

6. The welding system according to claim 1, wherein the second moving means comprises an actuator coupled to the welding torch.

7. A welding system comprising:
a welding unit including a welding torch positioned in proximity to a weld path on a component for forming a weldment along the weld path;
first means for moving the welding torch along the weld path;
second means for moving the welding torch relative to the weld path in directions normal to and transverse to the weld path; at least a pair of ultrasonic sensing devices operatively mounted with the welding unit for ultrasonically sensing the proximity of at least two surfaces and producing sensor outputs in proportion to the proximities of the surfaces;
means for inputting target values corresponding to a predetermined distance desired between the welding torch and the weld path during movement of the welding torch along the weld path by the first moving means; and
a programmable logic controller programmed to receive the sensor outputs from the pair of ultrasonic sensing devices, compare the sensor outputs to the target values, generate control outputs by interpolation based on the comparison between the sensor outputs and the target values, and send the control outputs to the second moving means to maintain the welding torch over the weld path and at the predetermined distance from the weld path during movement of the welding torch along the weld path by the first moving means.

8. The welding system according to claim 7, wherein the surfaces sensed by the pair of ultrasonic sensing devices are surfaces of the component spaced apart from the weld path.

9. The welding system according to claim 7, wherein the surfaces sensed by the pair of ultrasonic sensing devices are surfaces of the weld path.

10. The welding system according to claim 7, further comprising an input device for inputting the predetermined distance to the programmable logic controller.

11. The welding system according to claim 7, wherein the second moving means comprises at least two actuators coupled to the welding torch.

12. The welding system according to claim 7, further comprising at least a second ultrasonic sensing device operatively mounted with the welding unit for ultrasonically sensing the position of the welding unit along the weld path and producing a second sensor output in proportion to the position of the welding unit, wherein the programmable logic controller comprises means for receiving the second sensor output from the second ultrasonic sensing device, generating a second control output, and sending the second control output to the first moving means.

* * * * *